(12) United States Patent
Xia et al.

(10) Patent No.: US 9,764,964 B2
(45) Date of Patent: Sep. 19, 2017

(54) APPLICATION OF LACTAM AS SOLVENT IN NANOMATERIAL PREPARATION

(75) Inventors: Housheng Xia, Shanghai (CN); Guisheng Yang, Shanghai (CN)

(73) Assignee: Shanghai Genius Advanced Material (Group) Co., Ltd., Shanghai (CN)

(*) Notice: Subject to any disclaimer, the term of this patent is extended or adjusted under 35 U.S.C. 154(b) by 64 days.

(21) Appl. No.: 14/372,864

(22) PCT Filed: Jan. 19, 2012

(86) PCT No.: PCT/CN2012/070568
§ 371 (c)(1),
(2), (4) Date: Jul. 17, 2014

(87) PCT Pub. No.: WO2013/107017
PCT Pub. Date: Jul. 25, 2013

(65) Prior Publication Data
US 2015/0098883 A1    Apr. 9, 2015

(30) Foreign Application Priority Data

Jan. 17, 2012 (CN) .......................... 2012 1 0014380

(51) Int. Cl.
| | | |
|---|---|---|
| C01F 17/00 | (2006.01) |
| C01G 23/053 | (2006.01) |
| C01G 49/06 | (2006.01) |
| C01G 49/08 | (2006.01) |
| C01F 5/20 | (2006.01) |
| C01G 3/02 | (2006.01) |
| C01G 5/00 | (2006.01) |
| C01G 9/02 | (2006.01) |
| C01G 5/02 | (2006.01) |
| C01G 9/08 | (2006.01) |
| C01G 11/00 | (2006.01) |
| C01B 19/04 | (2006.01) |
| C01B 33/18 | (2006.01) |
| C01F 5/14 | (2006.01) |
| C01F 5/24 | (2006.01) |
| C01F 7/16 | (2006.01) |
| C01F 11/46 | (2006.01) |
| C22B 3/04 | (2006.01) |
| C22B 3/00 | (2006.01) |
| C22B 15/00 | (2006.01) |
| C01F 7/00 | (2006.01) |
| C01F 7/34 | (2006.01) |
| C01B 19/00 | (2006.01) |

(52) U.S. Cl.
CPC ........ *C01F 17/0043* (2013.01); *C01B 19/007* (2013.01); *C01B 19/04* (2013.01); *C01B 33/18* (2013.01); *C01F 5/14* (2013.01); *C01F 5/20* (2013.01); *C01F 5/24* (2013.01); *C01F 7/005* (2013.01); *C01F 7/162* (2013.01); *C01F 7/34* (2013.01); *C01F 11/462* (2013.01); *C01G 3/02* (2013.01); *C01G 5/00* (2013.01); *C01G 5/02* (2013.01); *C01G 9/02* (2013.01); *C01G 9/08* (2013.01); *C01G 11/00* (2013.01); *C01G 23/053* (2013.01); *C01G 23/0532* (2013.01); *C01G 23/0536* (2013.01); *C01G 49/06* (2013.01); *C01G 49/08* (2013.01); *C22B 3/04* (2013.01); *C22B 11/04* (2013.01); *C22B 15/0065* (2013.01); *C01P 2002/72* (2013.01); *C01P 2002/86* (2013.01); *C01P 2004/03* (2013.01); *C01P 2004/04* (2013.01); *C01P 2004/64* (2013.01); *C01P 2006/42* (2013.01)

(58) Field of Classification Search
CPC .......... C01F 17/0043; C01F 5/14; C01F 5/24; C01F 11/462; C01F 7/162; C01G 9/08; C01G 5/00; C01G 5/02; C01G 3/02; C01G 49/08; C22B 15/0065; C22B 11/04; C22B 3/04; C01B 19/04; C01B 33/18
See application file for complete search history.

(56) References Cited

FOREIGN PATENT DOCUMENTS

EP    1728814    * 12/2006

OTHER PUBLICATIONS

Pinna, Nico et al., Magnetite Nanocrystals: Nonaqueous Synthesis, Characterization, and Solubility, Chem. Mater. 2005, 17, 3044-3049.
Li, Zhen et al., One-Pot Reaction to Synthesize Water-Soluble Magnetite Nanocrystals, Chem. Mater. 2004, 16, No. 8.
Li, Zhen et al., Preparation of Water-Soluble Magnetite Nanocrystals from Hydrated Ferric Salts in 2-Pyrrolidone: Mechanism Leading to Fe3O4.
International Preliminary Report on Patentability, issued on Jul. 22, 2014 in the application PCT/CN2012/070568.
International Search Report, issued on Aug. 2, 2012, in the application PCT/CN2012/070568.
Translation of International Preliminary Report of Patentability, issued on Jul. 22, 2014, in the application PCT/CN2012/070568.
Translation of the Written Opinion of the International Search Authority, issued on Aug. 2, 2012, in the application PCT/CN2012/070568.

(Continued)

*Primary Examiner* — Steven Bos
(74) *Attorney, Agent, or Firm* — Zareefa B. Flener; Flener IP Law

(57) ABSTRACT

The present invention disclosed use of lactam as a solvent in the preparation of nanomaterials by precipitation method, sol-gel method or high temperature pyrolysis. These methods are able to recycle lactam solvent, which meet requirements of environmental protection.

19 Claims, 8 Drawing Sheets

(56) References Cited

OTHER PUBLICATIONS

Translation of the International Search Report, issued on Aug. 2, 2012, in the application PCT/CN2012/070568.
Written Opinion of the International Search Authority, issued on Aug. 2, 2012, in the application PCT/CN2012/070568.

\* cited by examiner

APPLICATION OF LACTAM AS SOLVENT IN NANOMATERIAL PREPARATION

TECHNICAL FIELD

This invention belongs to the technical field of nanomaterials, which relates to use of lactam as a solvent in preparation of nanomaterials.

BACKGROUND ART

Nanomaterials refer to those with at least one dimension in three-dimensional space within the nanoscale range (1-100 nm) or materials constituted by them as basic units. Nano-size effects often exhibit melting points and magnetic, optical, thermal conduction and electrical conduction characteristics which are different from bulk materials, so they can be widely used in optoelectronic materials, ceramic materials, sensors, semiconductor materials, catalytic materials, medical treatment and other fields.

Currently, the methods for synthesis of nanomaterials mainly include three categories: solid phase method, liquid phase method and gas phase method. Since nanomaterials have high surface energy, it is hard for nanomaterials obtained by various solid-phase synthesis methods, including high-temperature calcination and mechanical milling, to reach the characteristics of ultrafine size, narrow size distribution and high dispersibility. Gas phase method is an important method for synthesis of ultrafine nanopowder, for example, vapor deposition method is the technology most widely used in semiconductor industry to deposit a variety of nanomaterials, but this process has higher equipment requirements, and deposition of nanoparticles in matrix is often accompanied with permanent agglomeration of the nanoparticles, so it is difficult to ensure their monodispersity. Compared to the former two methods, liquid phase method can prepare nanomaterials of various morphologies and sizes by selecting appropriate solvents and additives. Currently, due to low cost and wide sources, water is the most commonly used solvent in liquid phase method. However, water has high polarity, the raw materials for synthesis of nanomaterials react fast in this medium, and it is very difficult to simply use water as the solvent for controlled synthesis of ideal nanomaterials, so improvement is generally made by adding surfactants and changing synthesis process. In almost all the methods currently reported in literatures and patents for synthesis of nanomaterials of monodispersity, small size and narrow distribution with water solvent system, surfactants or surfactant-like additives are used. These surfactants or additives not only increase the cost for preparation of nanomaterials, but also inevitably remain on the surface of nanomaterials, thus affecting their subsequent use, for example, residues may intoxicate some catalytic nanomaterials, affect biocompatibility of medical nanomaterials, etc.

Recently, a literature has reported use of organics as the solvents for synthesis of nanomaterials, such as the "alcohol-thermal method" using ethanol, ethylene glycol, propylene glycol, polyethylene glycol, etc. as the solvents and high-temperature pyrolysis, with oleic acid as the solvent, of metal oleate, carbonyl salts or acetylacetone to prepare oxides, but these methods still require to use surfactants or expensive organic metal salts, and even some synthetic routes need to consume organic solvents to provide oxygen required to produce oxides, which is not conducive to application of these methods [see specific literature: Magnetite Nanocrystals: Nonaqueous Synthesis, Characterization, and Solubility, Chem. Mater 2005, 17, 3044-3049].

Lactam is an organic compound containing amide groups in cycles, for its derivatives, some nitrogen atoms and hydrogen on carbon can be substituted by other groups, among which, butyrolactam (also called α-pyrrolidone) containing four carbon atoms is liquid at room temperature and a commonly used high-boiling-point polar solvent in organic systhesis. Recently, Gao, et al, has synthesized super paramagnetic ferroferric oxide <20 nm in size with carbonyl iron and ferric trichloride in butyrolactam solvent [see specific literature: One-Pot Reaction to Synthesize Water-Soluble Magnetite Nanocrystals, Chem. Mater., Vol. 16, No. 8, 2004; Preparation of Water-Soluble Magnetite Nanocrystals from Hydrated Ferric Salts in 2-Pyrrolidone: Mechanism Leading to $Fe_3O_4$, Angew. Chem. Int. Ed. 2005, 44, 123-126]. Butyrolactam used in this method itself is a highly toxic solvent, which brings great threat to production safety and environmental protection. More importantly, butyrolactam has a strong coordination effect and can be firmly adsorbed on the surface of nanomaterials, which will certainly affect the subsequent use of nanomaterials containing toxic components, especially in medical treatment, health, food and other fields. In addition, other literatures were restricted to synthesis of nano ferroferric oxide with butyrolactam as the solvent, but not investigated other oxides, hydroxides and metal nanomaterials.

Among lactams, except butyrolactam, cyclic lactams containing 5 or more carbon atoms in cycles are solid at room temperature, and the melting point increases with the number of carbon atoms, for example, the melting point was 39° C. for valerolactam, 68° C. for caprolactam and up to 153° C. for laurolactam, so it is difficult to think about through butyrolactam that lactams containing 5 or more carbon atoms should be used as the solvents for organic synthesis, and moreover, there is no report on use of them alone as the solvents for synthesis of nanomaterials. Such substances have the structures similar to that of butyrolactam, and at temperature higher than their melting points, they have relatively strong polarity, but weaker than the polarity of water, so they can not only guarantee certain solubility of raw materials for synthesis of nanomaterials in the solvents, but also slow down the reactions, thus they are a kind of ideal solvents for synthesis of nanomaterials. Most importantly, lactam's amide groups have a coordination effect and can play a role similar to surfactant, so no other surfactants are required for synthesis of nanomaterials when using this solvent. Furthermore, lactam derivatives contains two amide groups in the cycles, for example, succinimide, glutarimide, adipimide also have similar characteristics. Therefore, lactams containing 5 or more carbon atoms, above their melting points, can substitute other common solvents for preparation of nanomaterials.

SUMMARY OF THE INVENTION

For shortages of solid phase method, gas phase method and liquid phase method in existing techniques that are not conducive to preparation of nanomaterials with ultrafine size, narrow size distribution and high dispersibility, especially for the high toxicity of butyrolactam, which affects subsequent use of the synthetic nanoparticles, the present invention is to provide use of lactams as the solvents for preparation of nanomaterials.

The technical solutions of this invention are as follows:

This invention provides use of lactams as solvent in the synthesis of nanomaterials.

The lactam is one or more of substances selected from cyclic amides or cyclic amide derivatives.

The general structural formula of the mentioned cyclic amides is:

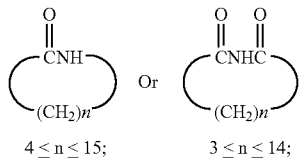

From valerolactam, caprolactam, oenantholactam, 2-azacyclononanone, nonanoylamide, caprinlactam, undecanoylamide, laurolactam, glutarimide or adipimide, in which caprolactam, laurolactam, glutarimide or adipimide are preferred, and caprolactam is more preferred.

The general structural formula of the mentioned cyclic amide derivatives is:

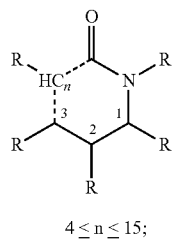

R is a substance selected from hydrogen, halogen, alkyl, hydroxy, alkoxy or acyl, wherein: halogen is selected from fluorine, chlorine, bromine or iodine; alkyl is selected from methyl, ethyl or propyl; alkoxy is selected from methoxy, ethoxy or propoxy; acyl is selected from acetyl or propionyl.

The cyclic amide derivatives are selected from N-methylvalerolactam, N-methylcaprolactam, N-vinylcaprolactam or N-methoxycaprolactam, and N-methylcaprolactam is preferred.

The nanomaterials refer to substances containing inorganic particles with 1 nm<particle size≤100 nm; the content of the inorganic particles is no less than 0.01%; the inorganic particles are mixtures composed of one or more of substances selected from hydroxides, oxides, sulfides, metals or inorganic salts.

The hydroxides refer to water-insoluble or slightly water-soluble inorganic compounds formed by one or more than one metal elements and hydroxyl, preferably mixtures composed of one or more of substances further selected from $Ni(OH)_2$, $Mg(OH)_2$, $Al(OH)_3$, $Nd(OH)_3$, $Y(OH)_3$, Mg—Al hydrotalcite or Zn—Al hydrotalcite.

The oxides refer to water insoluble or slightly soluble inorganic compounds formed by one or more metal elements or metalloid elements and oxygen, preferably mixtures composed of one or more of substances further selected from $Ag_2O$, $ZnO$, $Cu_2O$, $Fe_3O_4$, $SiO_2$, $MgAl_2O_4$ or $CaTiO_3$, preferably from $Ag_2O$, $ZnO$, $Cu_2O$ or $Fe_3O_4$.

The sulfides are the water insoluble or slightly soluble inorganic compounds formed by binding metal elements or metalloid elements with sulfur, selenium, tellurium, arsenic or antimony, preferably mixtures composed of one or more of substances further selected from CuS, ZnS, CdS, CdSe, CdTe, $WSe_2$, CuTe, $CoAs_2$ or GaAs, preferably ZnS, CdS, CdSe or CdTe.

The metals are water insoluble or slightly soluble substances composed of one or more of metal elements selected from Group IIIA, IVA, IB, IIB or VIII in the periodic table of elements, preferably are alloys or mixtures composed of one or more of substances selected from Fe, Ni, Cu, Ag, Pd, Pt, Au or Ru, preferably from Cu, Ag, Au, Pd or Cu—Ag alloy.

The inorganic salts refer to water insoluble or slightly soluble inorganic compounds formed by binding positive ions of metal elements with carbonate, sulfate, silicate or halogen negative ions, preferably mixtures composed of one or more of substances selected from $CaCO_3$, $MgCO_3$, $BaSO_4$, $CaSiO_3$, AgCl, AgBr or $CaF_2$, preferably from $MgCO_3$, $BaSO_4$, AgCl or $CaF_2$.

This invention also provides a method of using lactams as the solvents for preparation of nanomaterials. Lactams can partly or completely substitute currently commonly used solvents, including water, alcohol, polyhydric alcohols with molecular weight no higher than 5000, oleic acid and α-pyrrolidone, for preparation of various nanomaterials.

The methods for the lactam as a solvent for synthesis of nanomaterials include precipitation method, sol-gel method or high temperature pyrolysis.

The precipitation method for synthesis of nanomaterials includes the following steps: add 0.01-100 weight parts of precursor and 100 weight parts of lactam into the reactor and stir at 80-200° C. for 0.1-2 hr to make the precursor fully dissolved or dispersed in the molten lactam solvent, when stirring, add 0.05-50 weight parts of precipitant for sufficient precipitation reaction, with the reaction temperature of 80-250° C. and the reaction time of 0.1-200 hr, and obtain the nanomaterials after washing with water, separation and drying.

The lactam solvent has a purity ≥60% and moisture ≤30%.

The precursor is selected from soluble inorganic salts formed by binding metal cations with halogen, nitrate, nitrite, sulfate, sulfite or carbonate anions, further from $MgCl_2.6H_2O$, $Nd(NO_3)_3.6H_2O$, $Y(NO_3)_3.6H_2O$, $AlCl_3.9H_2O$, $Al_2(SO_4)_3.18H_2O$, $ZnCl_2$, $AgNO_3$, $CuSO_4.5H_2O$, $FeCl_2.4H_2O$, $FeCl_3.6H_2O$, $Cd(NO_3)_2.2H_2O$, $BaCl_2$ or $PdCl_2$; or from organic compounds containing metals or metalloids, further from zinc acetate, carbonyl iron, iron acetylacetonate, iron oleate, butyl titanate or tetraethyl orthosilicate.

The precipitant is selected from alkali metals, alkali metal oxides, alkali metal hydroxides, alkali metal organic salts, ammonia and compounds able to release ammonia by pyrolysis, soluble inorganic salts formed by metal elements and halogen elements, soluble inorganic salts formed by metal elements and chalcogens, soluble inorganic salts formed by metal elements and carbonate, or soluble inorganic salts formed by metal elements and sulfate; in which, alkali metals are further selected from Li, Na or K; alkali metal oxides are further selected from $Na_2O$, $K_2O$, $Na_2O_2$ or $K_2O_2$; alkali metal hydroxides are further selected from NaOH or KOH; alkali metal organic salts are further selected from sodium methoxide, sodium ethoxide, sodium phenoxide, potassium oleate, sodium lactam or potassium caprolactam; ammonia and compounds able to release ammonia by pyrolysis are further selected from ammonia gas, ammonia water, urea, ammonium carbonate or ammonium bicarbonate, preferably ammonia water; soluble inorganic salts formed by metal elements and halogen elements are further selected from NaCl, KCl, $MgCl_2$, $CaCl_2$, $AlCl_3.6H_2O$, $FeCl_2.4H_2O$ or $FeCl_3.6H_2O$, preferably NaCl or KCl; soluble inorganic salts formed by metal elements and chalcogens are further selected from $Na_2S$, $K_2S$, $Na_2S \cdot 9H_2O$, $Na_2Se$ or $NaHTe$; soluble inorganic salts formed by metal elements and carbonate are further selected from $Na_2CO_3$ or $K_2CO_3$; soluble inorganic salts formed by metal elements and sulfate are further selected from $Na_2SO_4$ or $K_2SO_4$.

During synthesis of nanomaterials by the precipitation method, after adding precipitant, further add 0.05-50 weight parts of reductant.

The sol-gel method for synthesis of nanomaterials with lactam as the solvent includes the following steps: add 0.01-100 weight parts of hydrolyzable precursor and 100 weight parts of lactam into the reactor and stir at 80-150° C. for 0.1-2 h to make the precursor fully dissolved or dispersed in the molten lactam solvent, and add 0.01-50 weight parts of water for hydrolysis to obtain sol, with the hydrolysis temperature of 80~250° C. and hydrolysis time of 0.01~48 hr; perform gelatinization at 80~270° C. for 0.01~96 hr, and obtain the nanomaterials after washing with water, separation and drying.

The hydrolyzable precursor is selected from hydrolyzable inorganic salts formed by binding metal cations with halogen, nitrate, sulfate or acetate anions or from metal organics; wherein: hydrolyzable inorganic salts formed by binding metal cations with halogen, nitrate, sulfate or acetate anions are further selected from $FeCl_2 \cdot 4H_2O$, $FeCl_3$, $FeCl_3 \cdot 6H_2O$, $Fe(NO_3)_3 \cdot 6H_2O$, $Fe_2(SO_4)_3$, $AlCl_3$, $AlCl_3 \cdot 6H_2O$, $CuSO_4 \cdot 5H_2O$, $CuCl_2$, $CuCl_2 \cdot 2H_2O$, $TiCl_3$, $TiCl_4$ or $Zn(OAc)_2 \cdot 2H_2O$, preferably $FeCl_3 \cdot 6H_2O$ or $AlCl_3$; metal organics are further selected from diethyl aluminium chloride, aluminum isopropoxide, diethyl zinc, tetraethyl orthosilicate, butyl titanate or tetraethyl titanate, preferably tetraethyl orthosilicate or butyl titanate.

The lactam solvent has a purity ≥60% and moisture ≤30%.

During systhesis of nanomaterials by the sol-gel method, after hydrolysis, further add 0.05-50 weight parts of reductant.

The high temperature pyrolysis method for synthesis of nanomaterials with lactam as the solvent includes the following steps: add 0.01-100 weight parts of pyrolyzable precursor and 100 weight parts of lactam into the reactor and stir at 80-150° C. for 0.1-2 hr to make the precursor fully dissolved or dispersed in the molten lactam solvent, perform pyrolysis at 100-270° C. for 0.1-20 hr, and obtain the nanomaterials after washing with water, separation and drying.

The pyrolyzable precursor is selected from soluble inorganic salts pyrolyzable in solvent no higher than 280° C. or from metal organics pyrolyzable in solvent no higher than 280° C.; in which, soluble inorganic salts pyrolyzable in solvent no higher than 280° C. are further selected from $AgNO_3$, $FeCl_3$, $Zn(OAc)_2$ or $TiCl_4$; metal organics pyrolyzable in solvent no higher than 280° C. are further selected from oleate, levulinate or carbonyl salts, preferably ferric oleate, acetylacetone or carbonyl iron $(Fe(CO)_5)$.

During systhesis of nanomaterials by the high temperature pyrolysis, after adding lactam, further add 0.05-50 weight parts of anion donors.

The anion donors are selected from compounds pyrolyzable at the temperature of ≤280° C. and able to produce anions required for synthesis of nanomaterials, further selected from benzyl alcohol, trioctylphosphine oxide (provide $O^{2-}$ required for synthesis of oxides) or tetramethyl thiuram disulfide (provide $S^{2-}$ required for synthesis of sulfides).

During systhesis of mixtures including nanoparticles/lactam by the high temperature pyrolysis, before pyrolysis at 100-270° C., further add 0.05-50 weight parts of reductant.

The reductant is selected from ascorbic acid, potassium borohydride, sodium borohydride, hydrazine, hydrazine hydrate, hydroxylamine or aldehyde group-containing organics; in which: aldehyde group-containing organics are further selected from formaldehyde, acetaldehyde, glyoxal, benzaldehyde or glucose.

During systhesis of nanomaterials by the precipitation method, sol-gel method or high temperature pyrolysis, after adding lactam, further add 0.01-20 weight parts of stabilizer or 0.1-80 weight parts of insoluble inorganics.

The stabilizer is selected from anionic surfactant, cationic surfactant, amphoteric surfactant or nonionic surfactant that adjusts the morphology of synthetic nanomaterials, in which: anionic surfactant is further selected from sodium dodecyl sulfate, sodium alkyl benzene sulfonate or sodium oleate, cationic surfactant is further selected from tetrapropylammonium hydroxide, tetrapropylammonium bromide, tetrapropylammonium chloride, cetyltrimethylammonium bromide, cetyltrimethylammonium chloride or dodecyltrimethylammonium bromide, amphoteric surfactant is further selected from dodecyl ethoxy sulfobetaine, octadecyl 2 hydroxyethyl amine oxide or octadecanamide dimethylamine oxide, and nonionic surfactant is further selected from triblock copolymer (P123, PEO-PPO-PEO), polyethylene glycol, polyvinyl pyridine, glycerol or 2-mercaptopropionic acid.

The insoluble inorganics are selected from the substances as the carrier or attachment point for synthesis of nanomaterials, further from activated carbon, graphene, carbon fibers, carbon nanotubes, molecular sieves, smectite clay, diatomaceous earth, glass fibers or glass microspheres.

The methods applicable to synthesis of nanomaterials with lactams as solvents also include cooperative use of precipitation method, sol-gel method, or high-temperature pyrolysis.

As the fact that presently lactams are only used as medical and pharmaceutical raw materials, polymer monomers and chemical intermediates, this invention has developed a new use of lactams as solvents for synthesis of nanomaterials.

Compared to existing techniques, this invention has the following advantages and beneficial effects:

1. Compared to other traditional uses, lactams, as the solvents for preparation of nanomaterials, have the following advantages: 1) nanomaterials belong to an emerging technology field and have added value higher than that of traditional polymers and pharmaceutical intermediates; 2) as solvents, if recovery conditions are appropriate, they can be recycled, which complies with environmental protection requirements.

2. In the field of synthesis of nanomaterials with liquid phase method, compared to water or other organic solvents, lactam solvents have the following advantages: 1) nanoparticles with the size of no larger than 100 nm can be synthesized with or without adding surfactant; 2) lactam solvents can well dissolve common water-soluble salts and organic metals, and under the premise of ensuring small size, high dispersibility and high crystallinity, the yield of nanoparticles per unit mass is high; 3) the synthesized oxide nanoparticles have narrow size distribution and high dispersibility and no residual surfactant; 4) lactam solvents have high boiling point and have no pressure-resistant requirements to reaction equipments at high-temperature synthesis; 5) lactam solvents do not participate in chemical reactions throughout the preparation and can be recycled, and are

DETAILED DESCRIPTION OF THE PREFERRED EMBODIMENTS

Further explanations are made to this invention in combination with the embodiments shown in the following diagrams.

Embodiment 1

Use of Caprolactam as Solvent for Synthesis of Nano-Mg(OH)$_2$ by Precipitation Method Add 20.3 g MgCl$_2$.6H$_2$O into 100 g molten caprolactam (purity of caprolactam ≥80%, moisture ≤20%) and stir at 100° C. for 30 min to make MgCl$_2$ fully dissolved. When stirring, rapidly add 10 g ammonia water (containing ammonia: 26%) and keep at constant temperature of 100° C. for 24 hr. Wash the obtained mixture with 200 g deionized water by centrifugation for three times, and obtain nano-Mg(OH)$_2$ powder after intensive drying and crushing.

Figure 1:
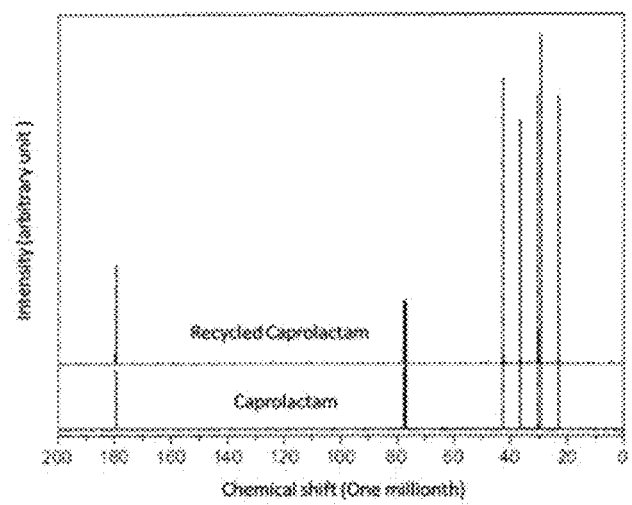
FIG. 1 ($^{13}$C-NMR) before and after use of caprolactam solvent for synthesis of nano-Mg(OH)$_2$ powder with the method in Embodiment 1.
Figure 2:
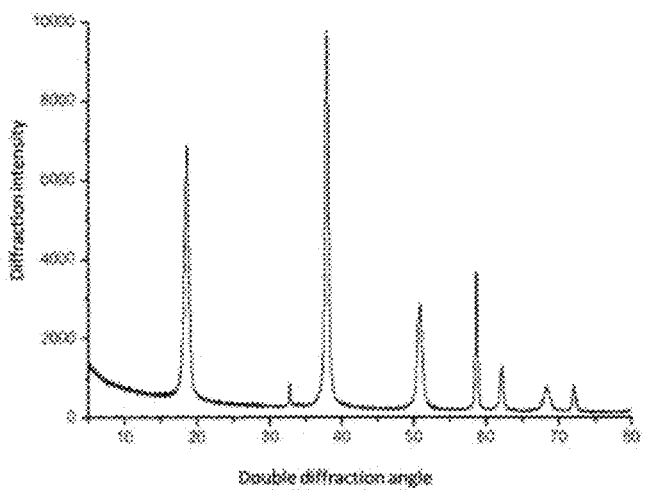
FIG. 2 X-ray diffraction diagram of synthetic nano-Mg(OH)$_2$ powder with the method in Embodiment 1.
Figure 3:
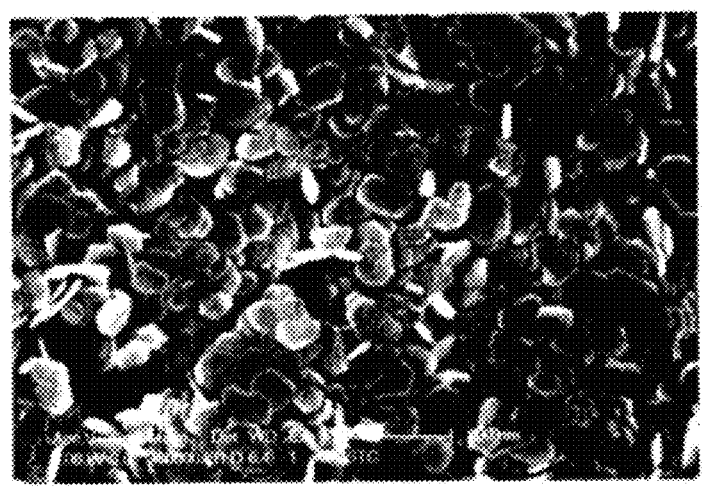
FIG. 3 Scanning electron microscopy image of synthetic nano-Mg(OH)$_2$ powder with the method in Embodiment 1.

FIG. 1 shows $^{13}$C-NMR before and after use of caprolactam solvent, deuterated chloroform is used as a solvent, and the spectrum keeps unchanged before and after use of caprolactam solvent, indicating that caprolactam solvent can be recycled. FIG. 2 is the X-ray diffraction diagram of synthetic nano-Mg(OH)$_2$ powder with the method in this Embodiment, and at the double diffraction angles 2θ=18.7°, 38.0°, 50.8° and 58.8°, the number of JCPDS card corresponding to the diffraction peak in comparison database is 44-1482, belonging to typical brucite crystal form, indicating that the product is high-purity Mg(OH)$_2$. Moreover, diffraction peak broadening is generally due to particle size refinement, indicating that the synthetic Mg(OH)$_2$ is small in particle size. However, diffraction peak intensity is still high, indicating that the synthetic material has high degree of crystallinity. FIG. 3 is the scanning electron microscopy (SEM) image of synthetic nano-Mg(OH)$_2$ powder with the method in this Embodiment, and the observation results show that Mg(OH)$_2$ powder is composed of regular hexagonal flaky nanoparticles of about 10 nm in thickness and about 80 nm in long diameter. Mg(OH)$_2$/PA6 nanocomposite can be obtained by mixing this Mg(OH)$_2$ powder as the filler, when the adding amount reaches 80 weight parts, Mg(OH)$_2$/PA6 nanocomposite can reach level V-0 inflaming retarding effect, and the tensile strength and notched impact strength still remain at 69.5 and 11.2 kJ/m$^2$ (the results are tested respectively according to ASTM-D638 and D6110 standard).

Embodiment 2

Figure 4:
FIG. 4 Transmission electron microscopy image of synthetic nano-Nd(OH)$_3$ powder with the method in Embodiment 2.

Use of Caprolactam as Solvent for Synthesis of Nano-Nd(OH)$_3$ by Precipitation Method Add 10.96 g Nd(NO$_3$)$_3$.6H$_2$O into 100 g molten caprolactam (purity of caprolactam ≥80%, moisture ≤20%) and stir at 200° C. for 30 min to make Nd(NO$_3$)$_3$.6H$_2$O fully dissolved. When stirring, rapidly add 3 g NaOH and keep at constant temperature of 200° C. for 24 hr. Wash the obtained mixture with 200 g deionized water by centrifugation for three times, and obtain nano-Nd(OH)$_3$ powder after intensive drying and crushing. FIG. 4 is transmission electron microscopy (TEM) image of synthetic nano-Nd(OH)$_3$ powder with the method in this Embodiment, and the observation results show that Nd(OH)$_3$ powder is composed of evenly dispersed rodlike nanoparticles of about 40 nm is mean length and about 7 nm in mean diameter.

Embodiment 3

Figure 5:
FIG. 5 Transmission electron microscopy image of synthetic nano-Al(OH)$_3$/Y(OH)$_3$ powder with the method in Embodiment 3.

Use of Caprolactam as Solvent for Synthesis of Nano-Al(OH)$_3$/Y(OH)$_3$ Compound by Precipitation Add 3.83 g Y(NO$_3$)$_3$.6H$_2$O and 4.02 g AlCl$_3$.9H$_2$O (molar ratio: [Y$^{3+}$]/[Al$^{3+}$]=3/5) into 100 g molten caprolactam (purity of caprolactam ≥80%, moisture ≤20%) and stir at 200° C. for 30 min to make Y(NO$_3$)$_3$.6H$_2$O and AlCl$_3$.9H$_2$O fully dissolved. When stirring, rapidly add 8 g NaOH and keep at constant temperature of 200° C. for 24 hr. Wash the obtained mixture with 200 g deionized water by centrifugation for three times, and obtain nano-Al(OH)$_3$/Y(OH)$_3$ powder after intensive drying and crushing. FIG. 5 is TEM image of synthetic nano-Al(OH)$_3$/Y(OH)$_3$ powder with the method in this Embodiment, and the observation results show that the product is aggregated by small particles of about 5 nm in diameter.

Embodiment 4

Use of Valerolactam as Solvent for Synthesis of Nano-Mg—Al Hydrotalcite by Precipitation Method Add 2.03 g MgCl$_2$.6H$_2$O and 3.33 g Al$_2$(SO$_4$)$_3$.18H$_2$O into 100 g molten valerolactam (purity of valerolactam >80%, moisture ≤20%) and stir at 120° C. for 30 min to make the raw materials fully dissolved, and add 1.4 g NaOH and 1.86 g Na$_2$CO$_3$ and keep at constant temperature of 150° C. for 24 hr. Wash the obtained mixture with 200 g deionized water by centrifugation for three times, and obtain nano-Mg—Al hydrotalcite powder after intensive drying and crushing.

Embodiment 5

Figure 6:
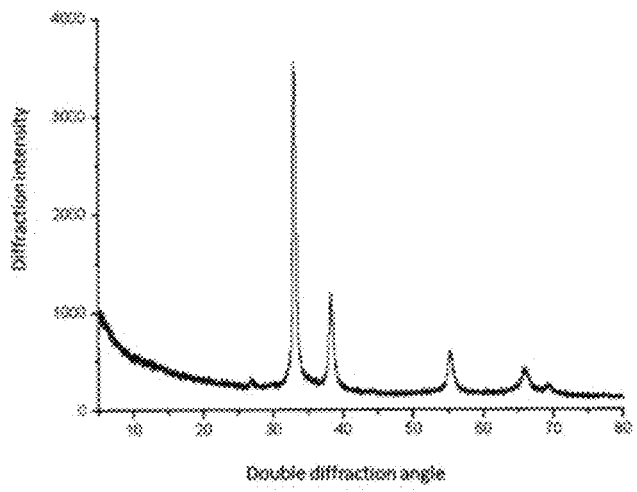
FIG. 6 X-ray diffraction diagram of synthetic nano-Ag$_2$O powder with the method in Embodiment 5.
Figure 7:
FIG. 7 Transmission electron microscopy image of synthetic nano-Ag$_2$O powder with the method in Embodiment 5.

Use of Caprolactam as Solvent for Synthesis of Nano-Ag$_2$O by Precipitation Method Add 4.24 g AgNO$_3$ into 100 g molten caprolactam (purity of caprolactam ≥60%, moisture ≤30%) and stir at 80° C. for 30 min to make AgNO$_3$ fully dissolved. When stirring, rapidly add 1 g NaOH and keep at constant temperature of 100° C. for 2 hr. Wash the obtained mixture with 200 g deionized water by centrifugation for three times, and obtain nano-Ag$_2$O powder after intensive drying and crushing. FIG. 6 is the X-ray diffraction diagram (XRD) of synthetic nano-Ag$_2$O powder with the method in this Embodiment, and positions and intensity of all the diffraction peaks perfectly match the JCPDS card 65-6811 of Ag$_2$O in the database, indicating that the product is high-purity Ag$_2$O. Moreover, diffraction peak broadening is generally due to particle size refinement, indicating that the synthetic Ag$_2$O is small in particle size. However, diffraction peak intensity is still high, indicating that the synthetic material has high degree of crystallinity. FIG. 7 is TEM image of synthetic nano-Ag$_2$O powder with the method in this Embodiment, and the observation results show that Ag$_2$O powder is composed of monodisperse spherical particles of about 5 nm in diameter.

Embodiment 6

Use of Caprolactam as Solvent for Synthesis of Nano-ZnO by Precipitation Method

Figure 8:
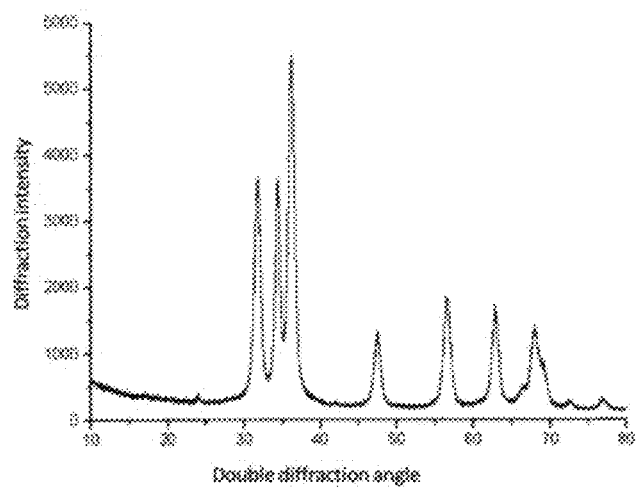
FIG. 8 X-ray diffraction diagram of synthetic nano-ZnO powder with the method in Embodiment 6.
Figure 9:
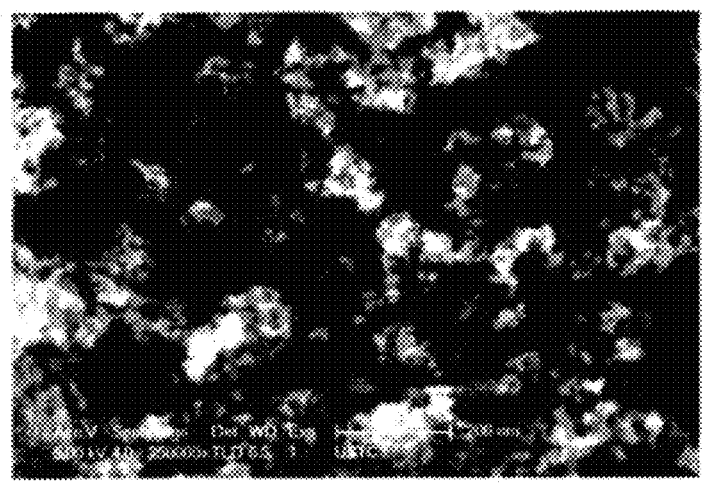
FIG. 9 Scanning electron microscopy image of synthetic nano-ZnO powder with the method in Embodiment 6.

Add 3.41 g ZnCl$_2$ into 100 g molten caprolactam (purity of caprolactam ≥80%, moisture ≤20%) and stir at 150° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing. FIG. 8 is the X-ray diffraction diagram (XRD) of synthetic nano-ZnO powder with the method in this Embodiment, and positions and intensity of all the diffraction peaks perfectly match the JCPDS card 36-1451 of zincite ZnO in the database, indicating that the product is high-purity ZnO. Moreover, diffraction peak broadening is generally due to particle size refinement, indicating that the synthetic ZnO is small in particle size. However, diffraction peak intensity is still high, indicating that the synthetic material has high degree of crystallinity and is very applicable to luminescent materials. FIG. 9 is SEM image of synthetic nano-ZnO powder with the method in this Embodiment, and the observation results show that ZnO powder is composed of spherical particles of about 8 nm in diameter and can be used for semiconductor luminescent quantum dots.

Embodiment 7

Figure 10:
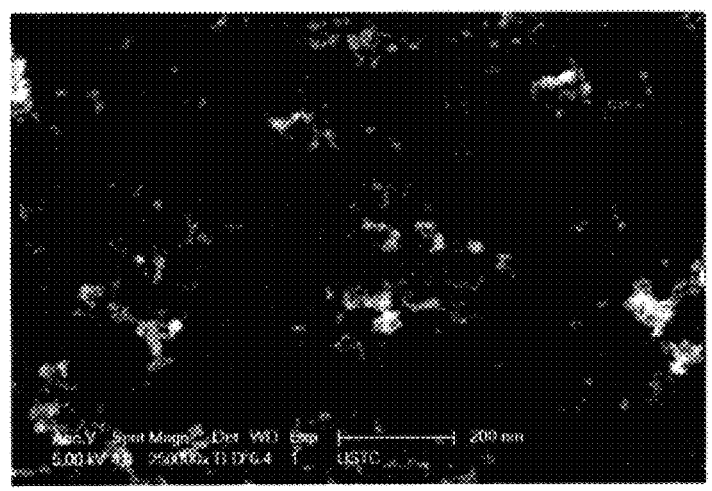
FIG. 10 Scanning electron microscopy image of synthetic nano-ZnO powder with the method in Embodiment 7.

Use of Valerolactam as Solvent for Synthesis of Nano-ZnO by Precipitation Method Add 3.41 g ZnCl$_2$ into 100 g molten valerolactam (purity of valerolactam ≥80%, moisture ≤20%) and stir at 150° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing FIG. 10 is SEM image of synthetic nano-ZnO powder with the method in this Embodiment, and the observation results show that the product is composed of monodisperse spherical particles of about 5 nm in diameter.

Embodiment 8

Use of Laurolactam as Solvent for Synthesis of Nano-ZnO by Precipitation Method

Figure 11:
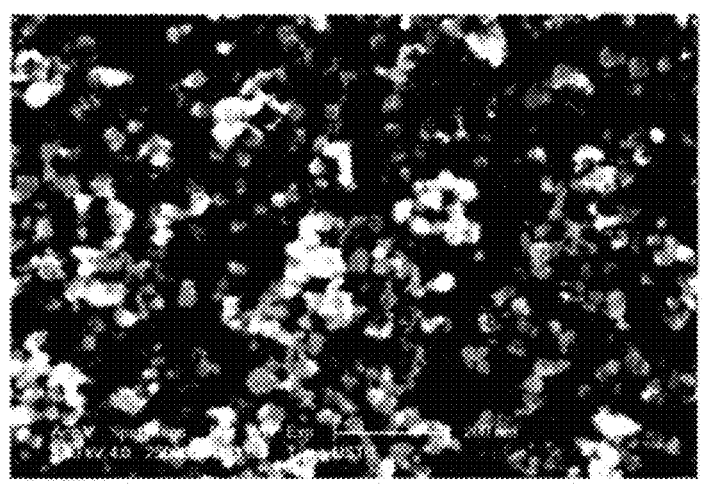
FIG. 11 Scanning electron microscopy image of synthetic nano-ZnO powder with the method in Embodiment 8.

Add 3.41 g ZnCl$_2$ into 100 g molten laurolactam (purity of laurolactam ≥90%, moisture ≤5%) and stir at 160° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing. FIG. 11 is SEM image of synthetic nano-ZnO powder with the method in this Embodiment, and the observation results show that the product is composed of monodisperse spherical particles of about 20 nm in diameter.

Embodiment 9

Use of Caprolactam/Laurolactam as Mixed Solvent for Synthesis of Nano-ZnO by Precipitation Method Add 3.41 g ZnCl$_2$ into mixed lactam solvent composed of 80 g caprolactam and 20 g laurolactam (purity of caprolactam and laurolactam ≥90%, moisture ≤5%) and stir at 160° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing, with the size of about 12 nm.

Embodiment 10

Use of Caprolactam/N-Methylcaprolactam as Mixed Solvent for Synthesis of Nano-ZnO by Precipitation Method Add 3.41 g ZnCl$_2$ into mixed lactam solvent composed of 80 g caprolactam and 20 g N-methylcaprolactam (purity of caprolactam and N-methylcaprolactam ≥90%, moisture ≤5%) and stir at 160° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing, with the size of about 10 nm.

Embodiment 11

Use of Valerolactam/Caprolactam/Laurolactam as Mixed Solvent for Synthesis of Nano-ZnO by Precipitation Method Add 3.41 g ZnCl$_2$ into mixed lactam solvent composed of 20 g valerolactam, 60 g caprolactam and 20 g laurolactam (purity of caprolactam ≥90%, moisture ≤5%; purity of valerolactam and laurolactam ≥80%, moisture ≤20%) and stir at 160° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing, with the size of about 10 nm, indicating that the size of synthetic nanomaterials can be effectively adjusted by changing the components of lactam solvent.

Embodiment 12

Use of Adipimide as Mixed Solvent for Synthesis of Nano-ZnO by Precipitation Method Add 3.41 g ZnCl$_2$ into 100 g molten adipimide (purity of adipimide ≥90%, moisture ≤5%) and stir at 160° C. for 30 min to make ZnCl$_2$ fully dissolved. When stirring, rapidly add 2 g NaOH and keep at constant temperature of 100° C. for 2 hr. Wash the obtained mixture with 200 g deionized water by centrifugation for three times, and obtain nano-ZnO powder after intensive drying and crushing.

Embodiment 13

Use of N-Methylcaprolactam as Solvent for Synthesis of Nano-ZnO by Precipitation Method Add 3.41 g ZnCl$_2$ into 100 g molten N-methylcaprolactam (purity of N-methylcaprolactam ≥99%, moisture <0.2%) and stir at 160° C. for 30 min to make ZnCl$_2$ fully dissolved. When stirring, rapidly add 2 g NaOH and keep at constant temperature of 100° C. for 8 hr. Wash the obtained mixture with 200 g deionized water by centrifugation for three times, and obtain nano-ZnO powder after intensive drying and crushing.

Embodiment 14

Use of Caprolactam as Solvent for Synthesis of Nano-CuO by Precipitation Method

Figure 12:
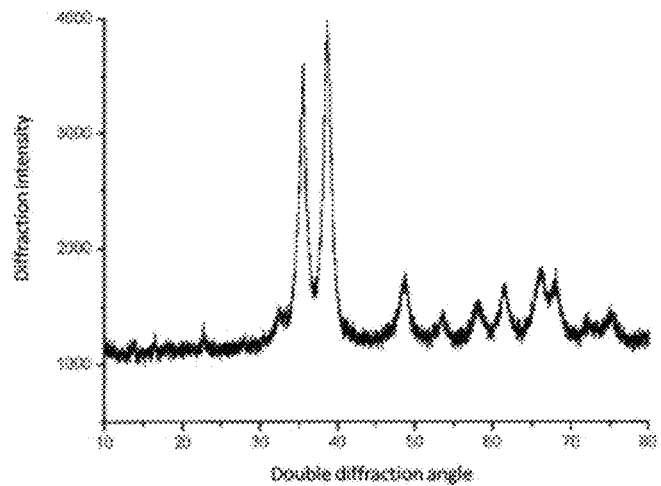
FIG. 12 X-ray diffraction diagram of synthetic nano-CuO powder with the method in Embodiment 14.
Figure 13:
FIG. 13 Transmission electron microscopy image of synthetic nano-CuO powder with the method in Embodiment 14.

Add 6.242 g CuSO$_4$.5H$_2$O into 100 g molten caprolactam (purity of caprolactam ≥80%, moisture ≤20%) and stir at 100° C. for 30 min to make CuSO$_4$.5H$_2$O fully dissolved. When stirring, rapidly add 2 g NaOH and keep at constant temperature of 100° C. for 2 hr. Wash the obtained mixture with 200 g deionized water by centrifugation for three times, and obtain nano-CuO powder after intensive drying and crushing. FIG. 12 is the X-ray diffraction diagram (XRD) of synthetic nano-CuO powder with the method in this Embodiment, and positions and intensity of all the diffraction peaks perfectly match the JCPDS card 44-0706 of CuO in the database, indicating that the product is high-purity CuO. Moreover, diffraction peak broadening is generally due to particle size refinement, indicating that the synthetic CuO is small in particle size. FIG. 13 is TEM image of synthetic nano-CuO powder with the method in this Embodiment, and the observation results show that the product is composed of monodisperse and narrow-distributed spherical particles of about 3.5 nm in diameter.

Embodiment 15

Figure 14:
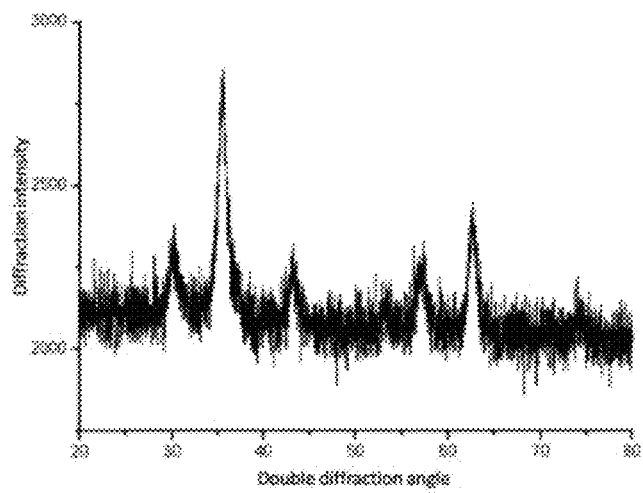
FIG. 14 X-ray diffraction diagram of synthetic nano-Fe$_3$O$_4$ powder with the method in Embodiment 15.
Figure 15:
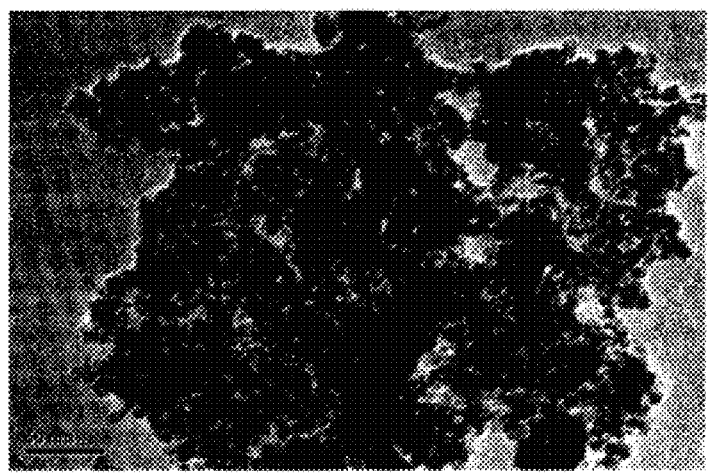
FIG. 15 Transmission electron microscopy image of synthetic nano-Fe$_3$O$_4$ powder with the method in Embodiment 15.
Figure 16:
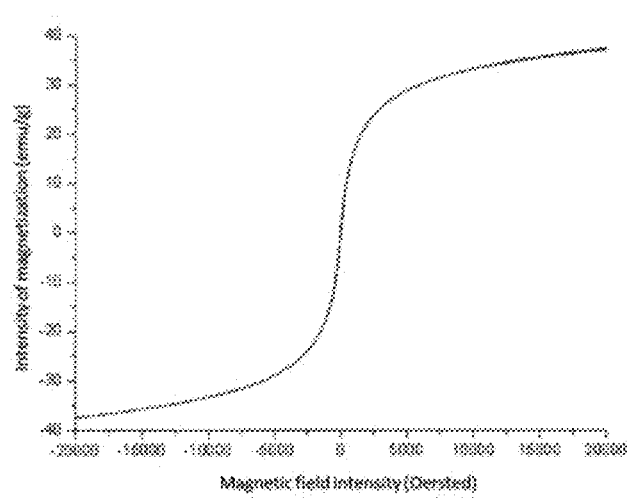
FIG. 16 Magnetization curve measured by Superconductivity Quantum Interference Device (SQUID) of synthetic nano-Fe$_3$O$_4$ powder with the method in Embodiment 15.

Use of Caprolactam as Solvent for Synthesis of Nano-Fe$_3$O$_4$ by Precipitation Method Add 4.1 g FeCl$_2$.4H$_2$O and 8.2 g FeCl$_3$.6H$_2$O into 100 g molten caprolactam (purity of caprolactam ≥80%, moisture ≤20%) and stir at 150° C. for 30 min to make them fully dissolved. When stirring, rapidly add 9.8 g KOH and keep at constant temperature of 100° C. for 2 hr. Wash the obtained mixture with 200 g deionized water by centrifugation for three times, and obtain nano-Fe$_3$O$_4$ powder after intensive drying and crushing. FIG. 14 is the X-ray diffraction diagram (XRD) of synthetic nano-Fe$_3$O$_4$ powder with the method in this Embodiment, and positions and intensity of all the diffraction peaks perfectly match magnetite Fe$_3$O$_4$ in the database, indicating that the product is high-purity Fe$_3$O$_4$. Moreover, diffraction peak broadening is generally due to particle size refinement, indicating that the synthetic Fe$_3$O$_4$ is small in particle size. FIG. 15 is TEM image of synthetic nano-Fe$_3$O$_4$ powder with the method in this Embodiment, and the observation results show that the product is composed of spherical particles of about 5 nm in diameter. FIG. 16 is magnetization curve measured by Superconductivity Quantum Interference Device (SQUID), and the results show that Fe$_3$O$_4$ powder is a super-paramagnetic material, with the saturation magnetization of 40 emu/g, and is very applicable to magnetic separation and MRI.

Embodiment 16

Use of Caprolactam as Solvent for Synthesis of Nano-MgCO$_3$ by Precipitation Method Add 20.3 g MgCl$_2$.6H$_2$O into 100 g molten caprolactam (purity of caprolactam ≥80%, moisture ≤20%) and stir at 100° C. for 30 min to make MgCl$_2$ fully dissolved. When stirring, rapidly add 15 g Na$_2$CO$_3$ and keep at constant temperature of 100° C. for 24 hr. Wash the obtained mixture with 200 g deionized water by centrifugation for three times, and obtain nano-MgCO$_3$ powder after intensive drying and crushing. The product is in flake structure, with the thickness of about 5 nm and long diameter of 60 nm.

Embodiment 17

Use of Caprolactam as Solvent for Synthesis of Nano-BaSO$_4$ by Precipitation Method Add 5.6 g BaCl$_2$ into 100 g molten caprolactam (purity of caprolactam ≥80%, moisture ≤20%) and stir at 100° C. for 30 min to make MgCl$_2$ fully dissolved. When stirring, rapidly add 3.0 g Na$_2$SO$_4$ and keep at constant temperature of 100° C. for 24 hr. Wash the obtained mixture with 200 g deionized water by centrifugation for three times, and obtain nano-BaSO$_4$ powder after intensive drying and crushing. The product is in flake structure, with the thickness of about 4 nm and long diameter of 90 nm.

Embodiment 18

Use of Caprolactam as Solvent for Synthesis of Nano-AgCl by Precipitation Method Add 2.1 g AgNO$_3$ into 100 g molten caprolactam (purity of caprolactam ≥80%, moisture ≤20%) and stir at 100° C. for 30 min to make AgNO$_3$ fully dissolved. When stirring, rapidly add 1.5 g NaCl and keep at constant temperature of 100° C. for 24 hr. Wash the obtained mixture with 200 g deionized water by centrifugation for three times, and obtain nano-AgCl powder after intensive drying and crushing. The product is composed of spherical particles, with the size of about 3 nm.

Embodiment 19

Use of Caprolactam as Solvent for Synthesis of Nano-ZnS by Precipitation Method

Figure 17:
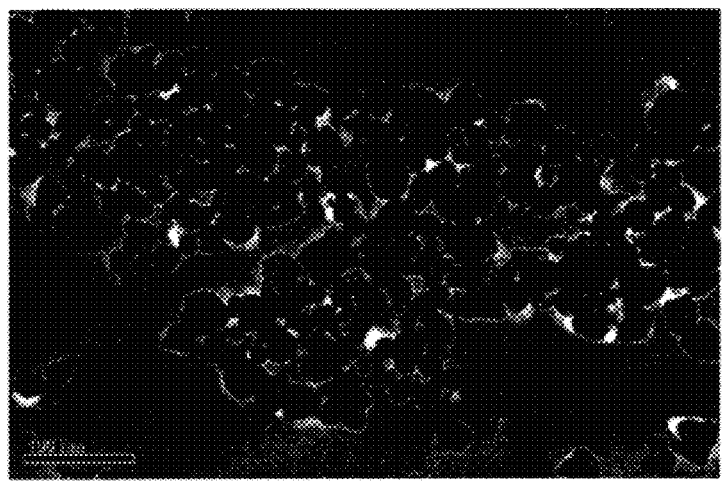
FIG. 17 Transmission electron microscopy image of synthetic nano-ZnS powder with the method in Embodiment 19.

Add 10.0 g ZnCl$_2$ into 100 g molten caprolactam (purity of caprolactam ≥80%, moisture ≤20%) and stir at 100° C. for 30 min to make ZnCl$_2$ fully dissolved. When stirring, rapidly add 12.0 g Na$_2$S.9H$_2$O and keep at constant temperature of 150° C. for 12 hr. Wash the obtained mixture with 200 g deionized water by centrifugation for three times, and obtain nano-ZnS powder after intensive drying and crushing. FIG. 17 is TEM image of synthetic nano-ZnS powder with the method in this Embodiment, and the observation results show that the product is composed of spherical particles of about 20 nm in diameter.

Embodiment 20

Use of Caprolactam as Solvent for Synthesis of Nano-CdSe by Precipitation Method Add 7.71 g Cd(NO$_3$)$_2$.2H$_2$O into 100 g molten caprolactam (purity of caprolactam ≥80%, moisture ≤20%) and stir at 100° C. for 30 min to make Cd(NO$_3$)$_2$.2H$_2$O fully dissolved. When stirring, rapidly add 3 g Na$_2$Se and keep at constant temperature of 150° C. for 12 hr. Wash the obtained mixture with 200 g deionized water by centrifugation for three times, and obtain nano-CdSe powder after intensive drying and crushing.

Embodiment 21

Figure 18:
FIG. 18 Transmission electron microscopy image of synthetic nano-CdTe powder with the method in Embodiment 21.

Use of Caprolactam as Solvent for Synthesis of Nano-CdTe by Precipitation Method Add 0.82 g Cd(NO$_3$)$_2$.2H$_2$O and 0.54 ml 2-mercaptopropionic acid (stabilizer) into 100 g molten caprolactam (purity of caprolactam ≥90%, moisture ≤1%) and stir at 80° C. for 30 min to make Cd(NO$_3$)$_2$.2H$_2$O and 2-mercaptopropionic acid fully dissolved. Under the protection of nitrogen, rapidly add 0.5 g NaHTe and keep at constant temperature of 90° C. for 14 hr. Wash the obtained mixture with 200 g deionized water by centrifugation for three times, and obtain nano-CdTe powder after intensive drying and crushing FIG. 18 is TEM image of synthetic nano-CdTe powder with the method in this Embodiment, and the observation results show that the product is composed of monodisperse spherical particles of about 5 nm in diameter and is very applicable to luminescent devices as semiconductor quantum dots.

Embodiment 22

Use of Caprolactam as Solvent for Synthesis of Nano-Ag by Precipitation Method

Figure 19:
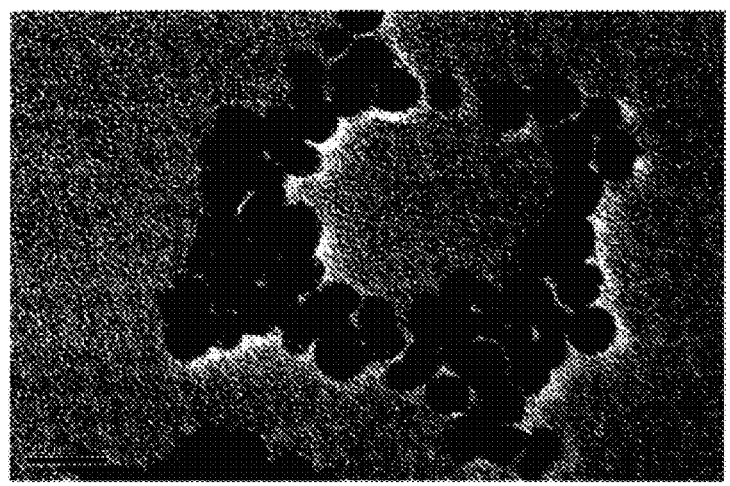
FIG. 19 Transmission electron microscopy image of synthetic nano-Ag powder with the method in Embodiment 22.

Add 4.24 g AgNO$_3$ into 100 g molten caprolactam (purity of caprolactam ≥80%, moisture ≤20%) and stir at 100° C. for 30 min to make AgNO$_3$ fully dissolved. When stirring, rapidly add 1 g NaOH and keep at constant temperature of 100° C. for 2 hr, and then add 2 g NaBH for continued reaction for 1 hr. Wash the obtained mixture with 200 g deionized water by centrifugation for three times, and obtain nano-Ag powder after intensive drying and crushing. FIG. 19 is TEM image of synthetic nano-Ag powder with the method in this Embodiment, and the observation results show that the product is composed of spherical particles of about 6 nm in diameter. This nano-Ag powder can be stably dispersed in water, alcohol and other solvents, and the dispersion liquid can be directly used as conductive adhesive and antibacterial agent.

Embodiment 23

Use of Caprolactam as Solvent for Synthesis of Nano-Ag by Precipitation Method

Figure 20:
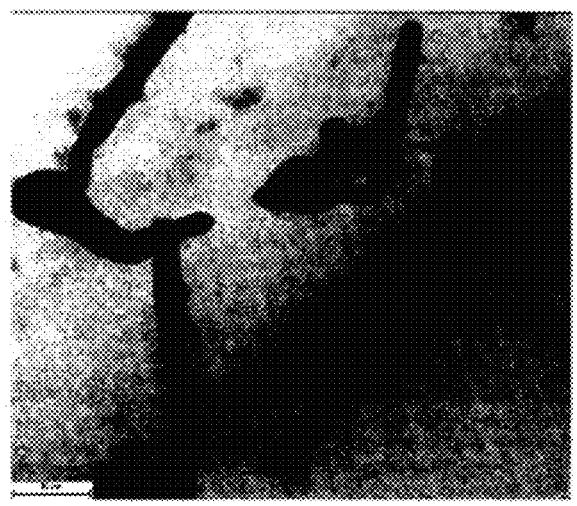
FIG. 20 Transmission electron microscopy image of synthetic nano-Ag powder with the method in Embodiment 23.

Add 4.24 g AgNO$_3$ and 10 g cetyltrimethylammonium bromide into 100 g molten caprolactam (purity of caprolactam ≥95%, moisture ≤1%) and stir at 100° C. for 30 min to make AgNO$_3$ and cetyltrimethylammonium bromide fully dissolved. When stirring, rapidly add 1 g NaOH and keep at constant temperature of 100° C. for 2 hr, and then add 2 g NaBH for continued reaction for 1 hr. Wash the obtained mixture with 200 g deionized water by centrifugation for three times, and obtain nano-Ag powder after intensive drying and crushing. FIG. 20 is TEM image of synthetic nano-Ag powder with the method in this Embodiment, and the observation results show that the product is composed of rodlike particles of about 15 nm in diameter and about 200 nm in length.

Embodiment 24

Use of Caprolactam as Solvent for Synthesis of Nano-Ag Plated Glass Microspheres by Precipitation Method Add 4.24 g AgNO$_3$ and 10 g glass microspheres (mean diameter is about 15 um) into 100 g molten caprolactam (purity of caprolactam ≥80%, moisture ≤20%) and stir at 100° C. for 1 hr to make glass microspheres fully dispersed. When stirring, rapidly add 1 g NaOH and keep at constant temperature of 100° C. for 30 min, and then add 2 g glucose for continued reaction for 12 hr. Wash the obtained mixture with 200 g deionized water by centrifugation for three times, and obtain nano-Ag plated glass microspheres after intensive drying and crushing. The nano-Ag plated glass microspheres can be used as an antibacterial component to be added in polymers and metals and as an electricity and heat conductive filler to be added in plastic and rubber.

Embodiment 25

Figure 21:
FIG. 21 Transmission electron microscopy image of synthetic nano-Cu powder with the method in Embodiment 25.

Use of Caprolactam as Solvent for Synthesis of Nano-Cu by Co-Precipitation Method Add 6.242 g CuSO$_4$.5H$_2$O into 100 g molten caprolactam (purity of caprolactam ≥80%, moisture ≤20%) and stir at 100° C. for 30 min to make CuSO$_4$.5H$_2$O fully dissolved. When stirring, rapidly add 1 g NaOH and keep at constant temperature of 120° C. for 2 hr, and then add 4 g ascorbic acid for reaction for 12 hr. Wash the obtained mixture with 200 g deionized water by centrifugation for three times, and obtain nano-Cu powder after intensive drying and crushing. FIG. 21 is TEM image of synthetic nano-Cu powder with the method in this Embodiment, and the observation results show that the product is composed of rodlike particles of about 300×30 nm in diameter.

Embodiment 26

Use of Caprolactam as Solvent for Preparation Activated Carbon Loaded Nano-Pd by Precipitation Method Add 5.0 g $PdCl_2$ and 10 g activated carbon (carrier) into 100 g molten caprolactam (purity of caprolactam ≥80%, moisture ≤20%) and stir at 100° C. for 30 min to make $PdCl_2$ fully dissolved. When stirring, rapidly add 1 g NaOH and keep at constant temperature of 100° C. for 2 hr, and then add 2 g $KBH_4$ for continued reaction for 2 hr. Wash the obtained mixture with 200 g deionized water by centrifugation for three times, and obtain activated carbon loaded nano-Pd after intensive drying and crushing. This activated carbon loaded nano-Pd has high catalytic activity in hydrogenation reduction of nitrobenzene-containing compounds to aminobenzene compound, and in catalytic hydrogenation of paranitrotoluene to produce 4-methylaniline, the conversion rate is 90% and the selectivity is 98%.

Embodiment 27

Use of Caprolactam as Solvent for Synthesis of Nano-$Fe_2O_3$ by Sol-Gel Method

Figure 22:
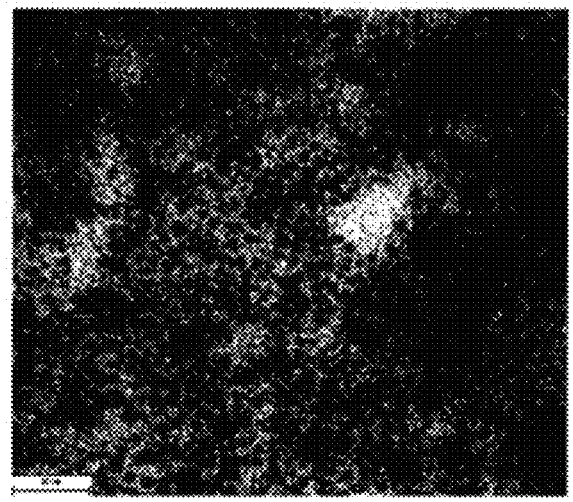
FIG. 22 Transmission electron microscopy image of synthetic nano-Fe$_2$O$_3$ powder with the method in Embodiment 27.

Add 8.2 g $FeCl_3 \cdot 6H_2O$ into 100 g molten caprolactam (purity of caprolactam ≥95%, moisture ≤1%) and stir at 80° C. for 30 min, add 5 g deionized water for hydrolysis reaction at 100° C. for 24 hr, and then vacuumize to remove water and shift to crystallization at 180° C. for 8 hr. Wash the obtained mixture with 200 g absolute alcohol by centrifugation for three times, and obtain nano-$Fe_2O_3$ powder after intensive drying and crushing. FIG. 22 is TEM image of synthetic nano-$Fe_2O_3$ powder with the method in this Embodiment, and the observation results show that the product is composed of particles of about 3 nm in diameter.

Embodiment 28

Use of Caprolactam as Solvent for Synthesis of Nano-Al$(OH)_3$ by Sol-Gel Method Add 6.4 g $AlCl_3$ into 100 g molten caprolactam (purity of caprolactam ≥99.5%, moisture ≤0.1%) and stir at 80° C. for 30 min, slowly add 10 g deionized water for hydrolysis reaction at 100° C. for 24 hr, and then vacuumize to remove water and shift to crystallization at 150° C. for 24 hr. Wash the obtained mixture with 200 g absolute alcohol by centrifugation for three times, and obtain nano-Al$(OH)_3$ powder after intensive drying and crushing. The powder is composed of irregular flaky particles of 2 nm in thickness.

Embodiment 29

Use of Caprolactam as Solvent for Synthesis of Nano-$SiO_2$ by Sol-Gel Method

Add 6 g tetraethyl orthosilicate into 100 g molten caprolactam (purity of caprolactam ≥60%, moisture ≤30%) and stir at 150° C. for 30 min, add 20 g deionized water for hydrolysis reaction at 120° C. for 15 hr, and then vacuumize to remove water and shift to crystallization at 200° C. for 24 hr. Wash the obtained mixture with 200 g absolute alcohol by centrifugation for three times, and obtain nano-$SiO_2$ powder after intensive drying and crushing, with the size of 50 nm.

Embodiment 30

Use of Caprolactam as Solvent for Synthesis of Nano-$SiO_2$ by Sol-Gel Method

Add 6 g tetraethyl orthosilicate into 100 g molten caprolactam (purity of caprolactam ≥60%, moisture ≤30%) and stir at 150° C. for 30 min, add 0.1 g deionized water for hydrolysis reaction at 120° C. for 15 hr, and then vacuumize to remove water and shift to crystallization at 200° C. for 24 hr. Wash the obtained mixture with 200 g absolute alcohol by centrifugation for three times, and obtain nano-$SiO_2$ powder after intensive drying and crushing, with the size of 12 nm.

Embodiment 31

Use of Caprolactam as Solvent for Synthesis of Nano-$SiO_2$ by Sol-Gel Method

Add 6 g tetraethyl orthosilicate into 100 g molten caprolactam (purity of caprolactam ≥60%, moisture ≤30%) and stir at 150° C. for 30 min, add 40 g deionized water for hydrolysis reaction at 120° C. for 5 hr, and then vacuumize to remove water and shift to crystallization at 200° C. for 24 hr. Wash the obtained mixture with 200 g absolute alcohol by centrifugation for three times, and obtain nano-$SiO_2$ powder after intensive drying and crushing, with the size of 80 nm.

Embodiment 32

Use of Caprolactam as Solvent for Synthesis of Nano-$TiO_2$ by Sol-Gel Method

Figure 23:
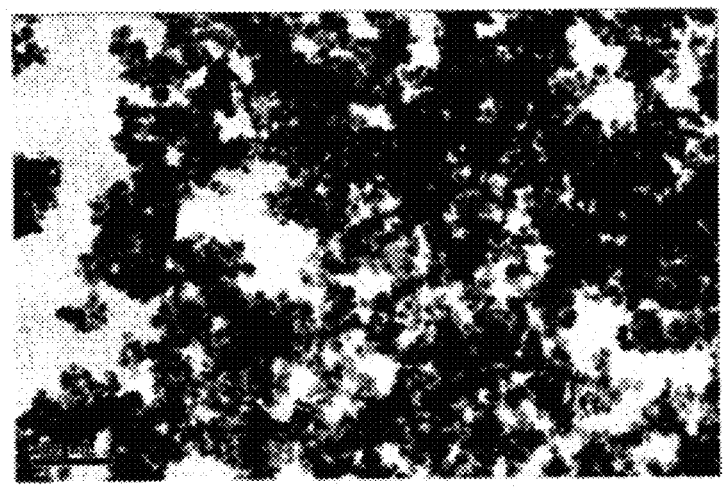
FIG. 23 Transmission electron microscopy image of synthetic nano-TiO$_2$ powder with the method in Embodiment 32.

Add 5 ml butyl titanate into 100 g molten caprolactam (purity of caprolactam ≥99.5%, moisture ≤0.1%) and stir at 80° C. for 30 min, add 5 g deionized water for hydrolysis reaction at 100° C. for 24 hr, and then vacuumize to remove water and shift to crystallization at 200° C. for 18 hr. Wash the obtained mixture with 200 g absolute alcohol by centrifugation for three times, and obtain nano-$TiO_2$ powder after intensive drying and crushing FIG. 23 is TEM image of synthetic nano-$TiO_2$ powder with the method in this Embodiment, and the observation results show that the product is composed of particles of about 7 nm in diameter.

Embodiment 33

Use of Caprolactam as Solvent for Synthesis of Nano-$Fe_3O_4$ by High-Temperature Pyrolysis Add 3.2 g carbonyl iron into 100 g molten caprolactam (purity of caprolactam ≥99.5%, moisture ≤0.1%) and stir at 150° C. for 30 min to make it fully dissolved, add 5 g glucose, and increase the temperature to 270° C. for reflux reaction for 2 hr. Wash the obtained mixture with 200 g absolute alcohol by centrifugation for three times, and obtain nano-$Fe_3O_4$ powder after intensive drying and crushing, with the size of 4 nm and the saturation magnetization of 65 emu/g.

Embodiment 34

Use of Caprolactam as Solvent for Synthesis of Nano-ZnS by High-Temperature Pyrolysis Add 2.2 g zinc acetate and 2.4 g tetramethylthiuram disulfide (donor of anion $S^{2-}$) into 100 g molten caprolactam (purity of caprolactam ≥90%, moisture ≤1%) and stir at 150° C. for 30 min to make it fully dissolved, and increase the temperature to 270° C. for reflux reaction for 2 hr. Wash the obtained mixture with 200 g absolute alcohol by centrifugation for three times, and obtain nano-ZnS powder after intensive drying and crushing.

Embodiment 35

Use of Caprolactam as Solvent for Synthesis of Nano-TiO$_2$ by High-Temperature Pyrolysis Add 1 g TiCl$_4$ and 1.4 g trioctylphosphine oxide (donor of anion O$^{2-}$) into 100 g molten caprolactam (purity of caprolactam ≥99.5%, moisture ≤0.01%) and stir at 80° C. for 30 min to make them fully dissolved, and increase the temperature to 270° C. for reflux reaction for 2 hr. Wash the obtained mixture with 200 g absolute alcohol by centrifugation for three times, and obtain nano-TiO$_2$ powder after intensive drying and crushing.

Embodiment 36

Use of Caprolactam as Solvent for Synthesis of Nano-Ag by High-Temperature Pyrolysis Add 4.24 g AgNO$_3$ into 100 g molten caprolactam (purity of caprolactam ≥99.5%, moisture ≤0.01%) and stir at 80° C. for 30 min to make AgNO$_3$ fully dissolved, add 5 g glucose, and increase the temperature to 200° C. for reaction for 12 hr. Wash the obtained mixture with 200 g absolute alcohol by centrifugation for three times, and obtain nano-Ag powder after intensive drying and crushing.

The above descriptions of the embodiments are to help ordinary technicians in this technical field understand and apply this invention. The technicians skilled in the field can readily make various modifications to these embodiments and apply the general principles described herein to other embodiments without creative work. Therefore, the present invention is not limited to the embodiments herein, and the improvement and modifications within the scope of this invention made by the technicians in this field according to the disclosure of this invention should be within the protection scope of this invention.

The invention claimed is:

1. A precipitation method for synthesis of nanomaterials, comprising the following steps:
   adding 0.01-100 weight parts of precursor and 100 weight parts of lactam solvent into a reactor to form a mixture;
   stirring the mixture at 80-200° C. for 0.1-2 hr wherein the lactam solvent becomes a molten lactam solvent in which the precursor is fully dissolved or dispersed, when stirring, adding 0.05-50 weight parts of precipitant, at a temperature of 80-250° C. and a time of 0.1-200 hr to obtain precipitate;
   washing the precipitate with water to obtain washed precipitate;
   centrifuging the washed precipitate to obtain centrifuged precipitate; and
   drying the centrifuged precipitate to obtain synthesized nanomaterials;
   wherein the precursor is selected from the group consisting of soluble inorganic metal salts of halogen, nitrate, nitrite, sulfate, sulfite or carbonate anions and organic compounds of metals or metalloids;
   wherein the lactam contained in the lactam solvent is one or more substances selected from cyclic amides or cyclic amide derivatives;
   wherein the general structural formula of the cyclic amides is:

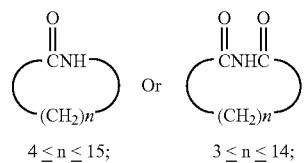

4 ≤ n ≤ 15;     3 ≤ n ≤ 14;

wherein the general structural formula of the cyclic amide derivatives is:

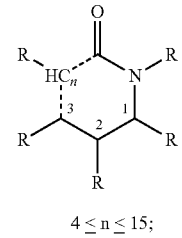

4 ≤ n ≤ 15;

wherein R is a substance selected from the group consisting of hydrogen, halogen, alkyl, hydroxy, alkoxy and acyl;
wherein the precipitant is selected from the group consisting of alkali metals, alkali metal oxides, alkali metal hydroxides, alkali metal organic salts, ammonia, compounds able to release ammonia by pyrolysis, soluble inorganic salts formed by metal elements and halogen elements, soluble inorganic salts formed by metal elements and chalcogens, soluble inorganic salts formed by metal elements and carbonate, and soluble inorganic salts formed by metal elements and sulfate; and
wherein the nanomaterials are substances containing inorganic particles having a particle size of greater than 1 nm and less than or equal to 100 nm; the content of the inorganic particles is no less than 0.01% of the substance; the inorganic particles are mixtures composed of one or more substances selected from the group consisting of hydroxides, oxides, sulfides, metals and inorganic salts.

2. The method according to claim 1, wherein alkali metals are selected from Li, Na or K;
wherein alkali metal oxides are selected from the group consisting of Na$_2$O, K$_2$O, Na$_2$O$_2$ and K$_2$O$_2$;
wherein alkali metal hydroxides are selected from the group consisting of NaOH and KOH;
wherein alkali metal organic salts are selected from the group consisting of sodium methoxide, sodium ethoxide, sodium phenoxide, potassium oleate, sodium lactam and potassium caprolactam;
wherein ammonia and compounds able to release ammonia by pyrolysis are selected from the group consisting of ammonia gas, ammonia water, urea, ammonium carbonate and ammonium bicarbonate;
wherein soluble inorganic salts formed by metal elements and halogen elements are selected from the group consisting of NaCl, KCl, MgCl$_2$, CaCl$_2$, AlCl$_3$.6H$_2$O, FeCl$_2$.4H$_2$O and FeCl$_3$.6H$_2$O;
wherein soluble inorganic salts formed by metal elements and chalcogens are selected from the group consisting of Na$_2$S, K$_2$S, Na$_2$S.9H$_2$O, Na$_2$Se and NaHTe;
wherein soluble inorganic salts formed by metal elements and carbonate are selected from the group consisting of Na$_2$CO$_3$ and K$_2$CO$_3$; and wherein soluble inorganic salts formed by metal elements and sulfate are selected from the group consisting of $Na_2SO_4$ and $K_2SO_4$.

3. The method according to claim 1, wherein during synthesis of nanomaterials by the precipitation method, after adding precipitant, further adding 0.05-50 weight parts of reductant.

4. The method of claim 1, wherein the precursor is selected from the group consisting of zinc acetate, carbonyl iron, iron acetylacetonate, iron oleate, butyl titanate and tetraethyl orthosilicate.

5. The method of claim 1, wherein the general structural formula of the cyclic amides is selected from valerolactam, caprolactam, oenantholactam, 2-azacyclononanone, nonanoylamide, caprinlactam, undecanoylamide, laurolactam, glutarimide or adipimide;

and wherein in the cyclic amide derivatives, halogen is selected from fluorine, chlorine, bromine or iodine; alkyl is selected from methyl, ethyl or propyl; and alkoxy is selected from methoxy, ethoxy or propoxy; and acyl is selected from acetyl or propionyl.

6. The method of claim 1, wherein the cyclic amide derivatives are selected from N-methylvalerolactam, N-methylcaprolactam, N-vinylcaprolactam or N-methoxycaprolactam.

7. The method according to claim 1, wherein in the inorganic particles, the hydroxides are water-insoluble or slightly water-soluble inorganic compounds formed by one or more than one metal elements and hydroxyl, and are mixtures composed of one or more substances selected from the group consisting of $Ni(OH)_2$, $Mg(OH)_2$, $Al(OH)_3$, $Nd(OH)_3$, $Y(OH)_3$, Mg—Al hydrotalcite and Zn—Al hydrotalcite;

wherein the oxides are water-insoluble or slightly water-soluble inorganic compounds formed by one or more metal elements and metalloid elements and oxygen, and are mixtures composed of one or more substances selected from the group consisting of $Ag_2O$, ZnO, $Cu_2O$, $Fe_3O_4$, $SiO_2$, $MgAl_2O_4$ and $CaTiO_3$;

wherein the sulfides are water-insoluble or slightly water-soluble inorganic compounds formed by binding metal elements or metalloid elements with sulfur, selenium, tellurium, arsenic or antimony, and are mixtures composed of one or more substances selected from the group consisting of CuS, ZnS, CdS, CdSe, CdTe, $WSe_2$, CuTe, $CoAs_2$ and GaAs;

wherein the metals are water-insoluble or slightly water-soluble substances composed of one or more of metal elements selected from Group IIIA, IVA, IB, IIB or VIII in the periodic table of elements, and are alloys or mixtures composed of one or more substances selected from the group consisting of Fe, Ni, Cu, Ag, Pd, Pt, Au and Ru; and wherein the inorganic salts are water-insoluble or slightly water-soluble inorganic compounds formed by binding positive ions of metal elements with carbonate, sulfate, silicate or halogen negative ions, and are mixtures composed of one or more substances selected from the group consisting of $CaCO_3$, $MgCO_3$, $BaSO_4$, $CaSiO_3$, AgCl, AgBr and $CaF_2$.

8. A sol-gel method for synthesis of nanomaterials with lactam as the solvent comprising the steps:

adding 0.01-100 weight parts of hydrolyzable precursor and 100 weight parts of lactam solvent into a reactor to form a mixture;

stirring the mixture at 80-150° C. for 0.1-2 hr to make the lactam solvent molten and to fully dissolve and disperse the hydrolysable precursor in the molten lactam solvent, and adding 0.01-50 weight parts of water for hydrolysis with the hydrolysis temperature of 80~250° C. and hydrolysis time of 0.01-48 hr to obtain sol;

performing gelatinization on the sol in the reactor at 80~270° C. for 0.01-96 hr to obtain a gelatinized mixture;

washing the gelatinized mixture with absolute alcohol to obtain a washed mixture; and drying the washed mixture to obtain synthesized nanomaterials;

wherein the hydrolyzable precursor is selected from the group consisting of inorganic metal salts of halogen, nitrate, sulfate or acetate anions and metal organics, wherein the lactam contained in the lactam solvent is one or more substances selected from the group consisting of cyclic amides and cyclic amide derivatives, wherein the general structural formula of the cyclic amide is:

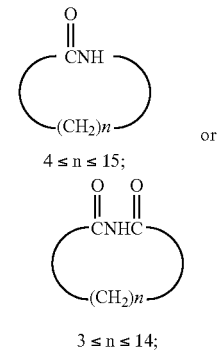

$4 \leq n \leq 15$;

$3 \leq n \leq 14$;

the general structural formula of the cyclic amide derivatives is:

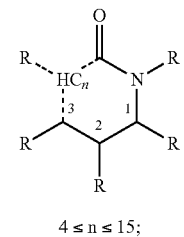

$4 \leq n \leq 15$;

wherein R is a substance selected from hydrogen, halogen, alkyl, hydroxy, alkoxy or acyl; and wherein the nanomaterials are substances containing inorganic particles having a particle size of greater than 1 nm and less than or equal to 100 nm; the content of the inorganic particles is no less than 0.01% of the substance; the inorganic particles are mixtures composed of one or more substances selected from the group consisting of hydroxides, oxides, sulfides, metals and inorganic salts.

9. The method according to claim 8, wherein synthesis of nanomaterials by the sol-gel method, further comprises, after hydrolysis, adding 0.05-50 weight parts of reductant.

10. The method as in claim 8 wherein the hydrolyzable inorganic salts are selected from the group consisting of $FeCl_2.4H_2O$, $FeCl_3$, $FeCl_3.6H_2O$, $Fe(NO_3)_3.6H_2O$, $Fe_2$ (SO$_4$)$_3$, AlCl$_3$, AlCl$_3$.6H$_2$O, CuSO$_4$.5H$_2$O, CuCl$_2$, CuCl$_2$.2H$_2$O, TiCl$_3$, TiCl$_4$ and Zn(OAc)$_2$.2H$_2$O; and wherein metal organics are selected from the group consisting of diethyl aluminium chloride, aluminum isopropoxide, diethyl zinc, tetraethyl orthosilicate, butyl titanate and tetraethyl titanate.

11. A high temperature pyrolysis method for synthesis of nanomaterials with lactam as the solvent comprising the steps:
adding 0.01-100 weight parts of pyrolyzable precursor and 100 weight parts of lactam solvent into a reactor to form a mixture;
stirring the mixture at 80-150° C. for 0.1-2 hr to create a molten lactam solvent from the lactam solvent and to fully dissolve or disperse the pyrolyzable precursor in the molten lactam solvent;
performing pyrolysis on the molten lactam solvent by raising the temperature to 100~270° C. for 0.1-20 hr whereby a pyrolysis product is formed;
washing the pyrolysis product with absolute alcohol; and
drying the washed pyrolysis product to obtain synthesized nanomaterials,
wherein the pyrolyzable precursor is selected from soluble inorganic salts pyrolyzable in solvent at a temperature of no higher than 280° C. or from metal organics pyrolyzable in solvent at a temperature of no higher than 280° C.,
wherein the lactam contained in the lactam solvent is one or more of the substances selected from cyclic amides or cyclic amide derivatives,
wherein the general structural formula of the cyclic amide is:

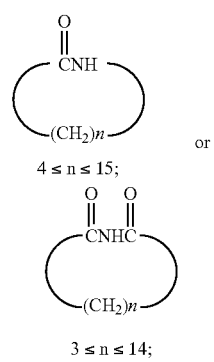

or $4 \leq n \leq 15$;

$3 \leq n \leq 14$;

wherein the general structural formula of the cyclic amide derivatives is:

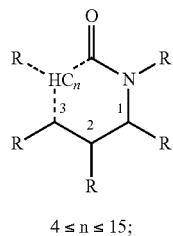

$4 \leq n \leq 15$;

wherein R is a substance selected from hydrogen, halogen, alkyl, hydroxy, alkoxy or acyl, and
wherein the nanomaterials are substances containing inorganic particles having a particle size of greater than 1 nm and less than or equal to 100 nm; the content of the inorganic particles is no less than 0.01% of the substance; the inorganic particles are mixtures composed of one or more substances selected from hydroxides, oxides, sulfides, metals or inorganic salts.

12. The method according to claim 11, wherein the soluble inorganic salts pyrolyzable in solvent at the temperature of no higher than 280° C. are selected from the group consisting of AgNO$_3$, FeCl$_3$, Zn(OAc)$_2$ and TiCl$_4$; and wherein the metal organics pyrolyzable in solvent at the temperature of no higher than 280° C. are selected from the group consisting of oleate, levulinate and carbonyl salts.

13. The method according to claim 11, further comprising, after adding lactam, adding 0.05-50 weight parts of anion donors.

14. The method according to claim 13, wherein the anion donors are compounds pyrolyzable at the temperature of less than or equal to 280° C. and able to produce anions required for synthesis of nanomaterials, and are selected from the group consisting of benzyl alcohol, trioctylphosphine oxide, and tetramethylthiuram disulfide.

15. The method according to claim 11, further comprising the step, before pyrolysis at the temperature of 100-270° C., adding 0.05-50 weight parts of reductant.

16. The method according to claim 3, 9 or 15, wherein the reductant is selected from the group consisting of ascorbic acid, potassium borohydride, sodium borohydride, hydrazine, hydrazine hydrate, hydroxylamine and aldehyde group-containing organics.

17. The method according to claim 1, claim 8, or claim 11, further comprising the step, after adding lactam solvent, adding 0.01-20 weight parts of stabilizer or 0.1-80 weight parts of insoluble inorganics.

18. The method according to claim 17, wherein the stabilizer is selected from the group consisting of anionic surfactant, cationic surfactant, amphoteric surfactant and nonionic surfactant that adjusts the morphology of synthetic nanomaterials, wherein anionic surfactant is selected from the group consisting of sodium dodecyl sulfate, sodium alkyl benzene sulfonate and sodium oleate; cationic surfactant is selected from the group consisting of tetrapropylammonium hydroxide, tetrapropylammonium bromide, tetrapropylammonium chloride, cetyltrimethylammonium bromide, cetyltrimethylammonium chloride anddodecyltrimethylammonium bromide; amphoteric surfactant is selected from the group consisting of dodecyl ethoxysulfobetaine, octadecyl 2 hydroxyethyl amine oxide and octadecanamide dimethylamine oxide; and nonionic surfactant is selected from the group consisting of triblock copolymer, polyethylene glycol, polyvinyl pyridine, glycerol and 2-mercaptopropionic acid.

19. The method according to claim 17, wherein the insoluble inorganics are substances that are the carrier or attachment point for synthesis of nanomaterials and are selected from the group consisting of activated carbon, graphene, carbon fibers, carbon nanotubes, molecular sieves, smectite clay, diatomaceous earth, glass fibers and glass microspheres.

* * * * *